United States Patent
Wang et al.

(10) Patent No.: US 10,521,196 B1
(45) Date of Patent: Dec. 31, 2019

(54) DISTRIBUTED LEDGER-BASED RAPID APPLICATION DEVELOPMENT

(71) Applicant: SAP SE, Walldorf (DE)

(72) Inventors: Qiu Shi Wang, Singapore (SG); Lin Cao, Singapore (SG)

(73) Assignee: SAP SE, Waldorf (DE)

( * ) Notice: Subject to any disclaimer, the term of this patent is extended or adjusted under 35 U.S.C. 154(b) by 0 days.

(21) Appl. No.: 16/151,889

(22) Filed: Oct. 4, 2018

(51) Int. Cl.
| | |
|---|---|
| *G06F 8/33* | (2018.01) |
| *G06F 8/34* | (2018.01) |
| *G06F 9/54* | (2006.01) |
| *G06F 9/455* | (2018.01) |
| *H04L 29/08* | (2006.01) |

(52) U.S. Cl.
CPC .............. *G06F 8/33* (2013.01); *G06F 8/34* (2013.01); *G06F 9/45529* (2013.01); *G06F 9/542* (2013.01); *G06F 9/547* (2013.01); *H04L 67/10* (2013.01)

(58) Field of Classification Search
CPC .......... G06F 8/33; G06F 8/34; G06F 9/45529; G06F 11/3664; G06F 9/547
See application file for complete search history.

(56) References Cited

U.S. PATENT DOCUMENTS

| | | | |
|---|---|---|---|
| 8,312,419 B2 | 11/2012 | Wilcock et al. | |
| 8,762,929 B2 | 6/2014 | Driesen | |
| 9,274,784 B2 | 3/2016 | Wang et al. | |
| 9,336,060 B2 | 5/2016 | Nori et al. | |
| 9,569,771 B2 | 2/2017 | Lesavich et al. | |
| 2017/0046651 A1 | 2/2017 | Lin et al. | |
| 2018/0247376 A1* | 8/2018 | Sharma | G06Q 40/08 |
| 2018/0293556 A1* | 10/2018 | Hyun | G06Q 20/0658 |
| 2018/0293557 A1* | 10/2018 | Kim | G06Q 20/3674 |
| 2018/0343111 A1* | 11/2018 | Chen | G06Q 20/0658 |
| 2019/0108482 A1* | 4/2019 | Vikas | G06Q 10/0838 |

OTHER PUBLICATIONS

Mills et al., "Distributed ledger technology in payments, clearing, and settlement" (Year: 2016).*
U.S. Appl. No. 15/949,339, filed Apr. 10, 2018, Wang et al.

* cited by examiner

*Primary Examiner* — Phillip H Nguyen
(74) *Attorney, Agent, or Firm* — Fish & Richardson P.C.

(57) ABSTRACT

Methods, systems, and apparatus, including computer programs encoded on a computer storage medium, employing a distributed ledger for cloud based rapid application development. In one aspect, a method for executing actions on a distributed ledger through a cloud-based ledger service instance, the method includes receiving a metadata file from a cloud-based mobile application service, establishing a connection to an instance of a cloud-based ledger service, and for each of a plurality of actions: determining an application program interface (API) call of the cloud-based ledger service instance to execute the action on the distributed ledger, dispatching the determined API call with the respective attributes for the action; and receiving a response from the cloud-based ledger service instance based on a result of the determined API call.

20 Claims, 5 Drawing Sheets

DISTRIBUTED LEDGER-BASED RAPID APPLICATION DEVELOPMENT

TECHNICAL FIELD

The presented disclosure relates generally to a metadata driven rapid application development system for a distributed ledger

BACKGROUND

Distributed ledger (e.g., blockchain) is a technology that has emerged in recent years. Distributed ledger based solutions may involve various platforms and technologies. Such prevalent solutions may be, for example, cloud based where a distributed ledger as a service (e.g., blockchain as a service (BaaS)) is running on a cloud platform to provide application programming interfaces (APIs) for different programming languages to consume. Therefore, developing a distributed ledger based application may require developers to understand the technical details of all these APIs and have the ability to code in different programming languages for different devices and platforms. For example, a task that may be daunting for analysts or consultants who are more familiar business use cases of blockchain, but not various programming techniques, may have a difficult time developing such distributed ledger based applications. Thus, there is a strong requirement to enable business analysts to easily consume BaaS and rapidly develop distributed ledger based application, without knowing the technical details of the provided APIs and various programming languages.

SUMMARY

Implementations of the present disclosure are generally directed to a cloud based system for distrusted ledger (e.g., a blockchain) rapid application development. Metadata may be employed for rapid application development to simplify development process, lessen technical requirements, hide technical details of blockchain service, and empower analysts and consultants without strong technology knowledge and programming skills.

In a general implementation, a computer-implemented method being executed by one or more processors for executing a plurality of actions on a distributed ledger through a cloud-based ledger service instance include receiving a metadata file from a cloud-based mobile application service. The metadata file including service connection data and the actions to be executed on the distributed ledger, wherein each of the actions includes a plurality of attributes. A connection is established to an instance of a cloud-based ledger service based on the service connection data and an identified application environment platform, wherein the instance of the cloud-based ledger service executes and commits transactions to the distributed ledger. For each of the actions an API call of the cloud-based ledger service instance to execute the action on the distributed ledger is determined, the determined API call is dispatched with the respective attributes for the action, and a response is received from the cloud-based ledger service instance based on a result of the determined API call.

In another general implementation, one or more non-transitory computer-readable storage media coupled to one or more processors and having instructions stored thereon which, when executed by the one or more processors, cause the one or more processors to perform operations that include receiving a metadata file from a cloud-based mobile application service. The metadata file including service connection data and the actions to be executed on the distributed ledger, wherein each of the actions includes a plurality of attributes. A connection is established to an instance of a cloud-based ledger service based on the service connection data and an identified application environment platform, wherein the instance of the cloud-based ledger service executes and commits transactions to the distributed ledger. For each of the actions an API call of the cloud-based ledger service instance to execute the action on the distributed ledger is determined, the determined API call is dispatched with the respective attributes for the action, and a response is received from the cloud-based ledger service instance based on a result of the determined API call.

In yet another general implementation, a system includes one or more processors; and a computer-readable storage device coupled to the one or more processors and having instructions stored thereon which, when executed by the one or more processors, cause the one or more processors to perform operations that include receiving a metadata file from a cloud-based mobile application service. The metadata file including service connection data and the actions to be executed on the distributed ledger, wherein each of the actions includes a plurality of attributes. A connection is established to an instance of a cloud-based ledger service based on the service connection data and an identified application environment platform, wherein the instance of the cloud-based ledger service executes and commits transactions to the distributed ledger. For each of the actions an API call of the cloud-based ledger service instance to execute the action on the distributed ledger is determined, the determined API call is dispatched with the respective attributes for the action, and a response is received from the cloud-based ledger service instance based on a result of the determined API call.

In an aspect combinable with any of the previous aspects, the method or operations include: before establishing the connection to the instance, determining a native API executor based on the identified application environment platform, wherein the connection is established through the determined native API executor.

In an aspect combinable with any of the previous aspects, each of the actions includes an event handler configured to perform a respective task.

In an aspect combinable with any of the previous aspects, the event handlers are configured through property values.

In an aspect combinable with any of the previous aspects, the attributes for each action include an action identifier and a name, and wherein the API is dispatched based on the action identifier and the name.

In an aspect combinable with any of the previous aspects, the method or operations include: executing, through a cross-platform script engine, a custom rule based on a triggered action event, the custom rule included as an attribute for one of the actions.

In an aspect combinable with any of the previous aspects, the custom rule includes a JavaScript executable.

In an aspect combinable with any of the previous aspects, the metadata file was composed within a cloud-based metadata studio through a drag-and-drop visual editor using intelligent code completion.

In an aspect combinable with any of the previous aspects, the service connection data includes a uniform resource locator (URL) to establish the connection to the instance of the cloud-based ledger service instance.

In an aspect combinable with any of the previous aspects, the metadata file is a delta update for a previously received metadata file.

In an aspect combinable with any of the previous aspects, the actions are chained, nested, or recursively executed.

In an aspect combinable with any of the previous aspects, the metadata file is written in JavaScript Object Notation (JSON).

In an aspect combinable with any of the previous aspects, the cloud-based mobile application service and the cloud-based ledger service instance are hosted on a cloud-based platform.

In an aspect combinable with any of the previous aspects, the metadata file is minified and synchronized to persistent repositories of on the cloud-based platform.

In an aspect combinable with any of the previous aspects, the instance of the cloud-based ledger service maintains a copy of the distributed ledger.

Particular implementations of the subject matter described in this disclosure can be implemented so as to realize one or more of the following advantages. The described rapid application development system eliminates the technical barriers of distributed ledger based application development and empowers analysts and consultants to rapidly develop applications without requiring knowledge of the technical details for the APIs for respective distributed ledger services. In some implementations, the described system is metadata driven and provides a cross-platforms solution. For example, metadata may be generated once, and then is reusable within multiple mobile and desktop platforms without further modification. The described system also provides a visual development environment that provides an easy to use interface that decreases both user ramp up and overall development time.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

This disclosure generally describes example systems and methods for a metadata driven rapid application development system for a distrusted ledger (e.g., a blockchain) and is presented to enable any person skilled in the art to make and use the disclosed subject matter in the context of one or more particular implementations. Various modifications to the disclosed implementations will be readily apparent to those skilled in the art, and the general principles defined in this application may be applied to other implementations and applications without departing from the scope of the disclosure. Thus, the present disclosure is not intended to be limited to the described or illustrated implementations, but is to be accorded the widest scope consistent with the principles and features disclosed in this application.

In some implementations, the described rapid application development system is metadata driven and includes a cross-platform SDK. Particularly, a cross-platform SDK that enables analysts and consultants to rapidly develop distributed ledger (e.g., blockchain) applications running on multiple platforms by writing metadata in a lightweight data-interchange format (e.g. JSON). With the help of a cloud-based metadata studio, which is part of the SDK, metadata can be automatically generated by drag-and-drop in a visual editor and using intelligent code completion. This greatly simplifies and optimizes complex distributed ledger based development environments and processes by eliminating technical barriers faced by analysts and consultants. Thus, empowering them to apply distributed ledger based technologies to various industries and lines of business without technical constraints.

In some implementations, the described cross-platform SDK includes a CPR component and a Cloud Based Metadata Studio (CBMS) component. The CPR component may run on multiple platforms and devices, such as iOS, Android, Windows, and so forth. In some implementations, the CPR component can interpret metadata and generate API calls to BaaS on the cloud, and process responses from BaaS. The CBMS may be integrated with, for example, a What You See Is What You Get (WYSIWYG) drag-and-drop visual editor and intelligent code completion to help business analysts and consultants write metadata.

In some implementations, the described rapid application development system employs a distributed ledger. An example distributed ledger is the commonly known Blockchain (or blockchain). Blockchain is referenced within the present disclosure for purposes of illustration. It is contemplated, however, that any appropriate distributed ledger can be used in implementations of the present disclosure. A blockchain is a (e.g., private) ledger of transactions that have been executed in one or more contexts A blockchain may grow as completed blocks are added with a new set of transactions. In some examples, a single block is provided from multiple transactions In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions (e.g., deposits, withdrawals, and so forth) to validate a requested transaction, entities must agree on which transactions have actually occurred, and in which order. For example, if two entities observe different transaction histories, they will be unable to come to the same conclusion regarding the validity of a transaction. The blockchain enables the entities to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

A private blockchain network may require, for example, an invitation and must be validated by either the network starter or by a set of rules put in place by the network starter. Entities that set up a private blockchain, will generally set up a permissioned network. Such a network places restrictions on who is allowed to participate in the network, and/or the data to which each entities is allowed access. For example, participants is a permissioned network need to obtain an invitation or permission to join. The access control mechanism may vary. For example, existing participants may decide future entrants, a regulatory authority may issue licenses for participation or a consortium could make the decisions instead. Once an entity has joined the network, it may then play a role in maintaining the blockchain in a decentralized manner.

In some implementations, validation of transactions includes verifying digital signatures associated with respective transactions. For a block to be added to the blockchain, proof of work must be demonstrated before a proposed block of transactions is accepted, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to-be-created block, and a nonce value (e.g., a random number used only once). The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In some cases, the distributed ledger or blockchain system can include one or more sidechains. A sidechain can be described as a blockchain that validates data from other blockchains. In some examples, a sidechain enables ledger assets (e.g., a digital currency) to be transferred between multiple blockchains.

In view of the foregoing, and as described in further detail herein, implementations of the present disclosure provide a cloud based system for distributed ledger rapid application development. The described system employs metadata driven technology to simplify development process, lessen technical requirements, hide technical details of blockchain service, and empower analysts and consultants without strong technology knowledge and programming skill, to rapidly develop applications. Implementations may be based on Systeme, Anwendungen, Produkte (SAP) Leonardo Blockchain services and Mobile services on SAP Cloud Platform or any other services from other vendors providing similar capabilities.

In some implementations, the rapid application development system includes two architectural components: Cross-Platform Runtime (CPR) and Cloud Based Metadata Studio (CBMS). In some implementations, the CPR is a component of the mobile or desktop application development SDK, which can be compiled into mobile or desktop applications. In runtime, the CPR can pull or receive metadata from mobile services on the cloud, caching metadata on mobile devices. Distributed ledger based engines can interpret metadata and generate ledger API calls to distributed ledger services on the cloud as well as receive and process responses from the distributed ledger services.

In some implementations, the CBMS is a cloud metadata studio that can facilitate analysts and consultants to rapidly generate metadata with the help of WYSIWYG visual editor and intelligent code completion. After metadata is generated, the CBMS may also automatically synchronized to repositories of mobile services on the cloud where it can be pushed to (or pulled from) desktop and mobile devices.

Figure 1:
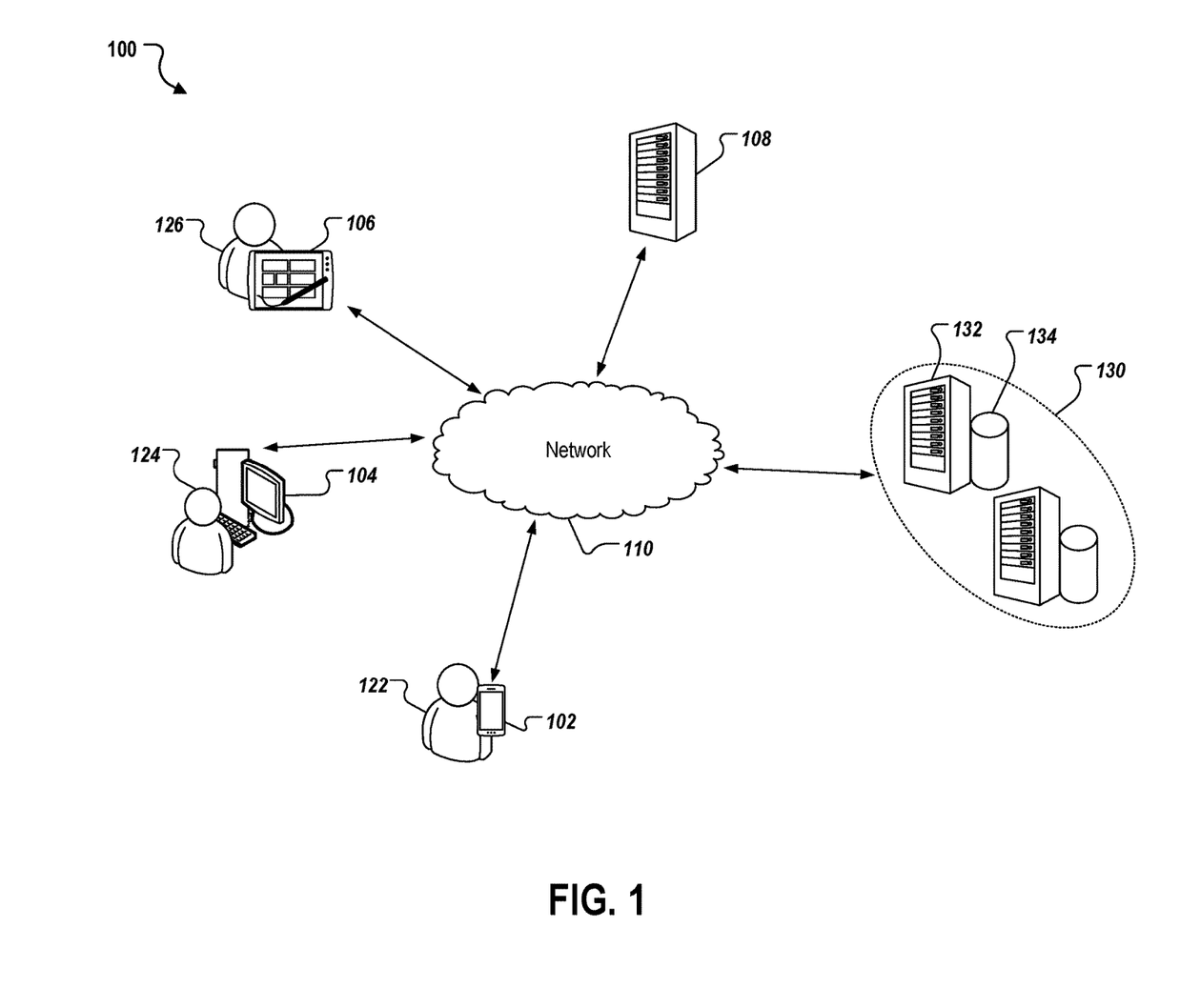
FIG. 1 depicts an example environment that can be employed to execute implementations of the present disclosure.
Figure 2:
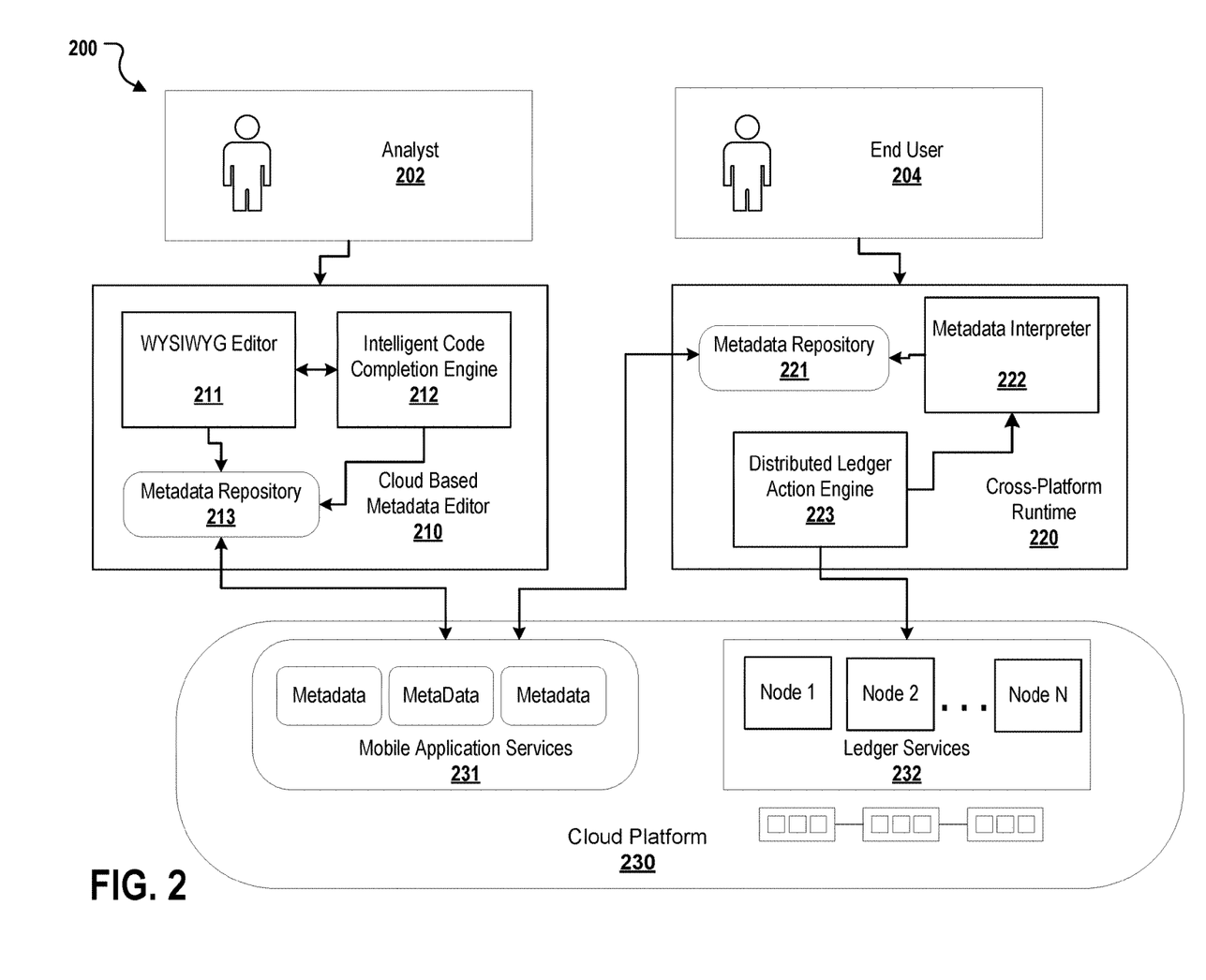
FIG. 2 depicts an example cross-platform software development kit (SDK) for a rapid application development system.

FIG. 1 depicts an example environment 100 that can be employed to execute implementations of the present disclosure. The example system 100 includes computing devices 102, 104, 106, 108, a back-end system 130, and a network 110. In some implementations, the network 110 includes a local area network (LAN), wide area network (WAN), the Internet, or a combination thereof, and connects web sites, devices (e.g., the computing devices 102, 104, 106, 108) and back-end systems (e.g., the back-end system 130). In some implementations, the network 110 can be accessed over a wired and/or a wireless communications link. For example, mobile computing devices (e.g., the smartphone device 102 and the tablet device 106), can use a cellular network to access the network 110. In some examples, the users 122, 124, 126 may be working as analysts and interacting with a rapid application development system, such as depicted in FIG. 2.

In the depicted example, the back-end system 130 includes at least one server system 132 and a data store 134. In some implementations, the server system 132 hosts one or more computer-implemented services employed within a rapid application development system that users 122, 124, 126 can interact with using the respective computing devices 102, 104, 106. For example, the computing devices 102, 104, 106 may be used by respective users 122, 124, 126 to rapidly develop distributed ledger applications running on multiple platforms by writing metadata in a lightweight data-interchange format over the network 110 through services hosted by the back-end system 130. In some implementations, the back-end system 130 provides an API services with which the server computing device 108 may communicate.

In some implementations, the back-end system 130 may include server-class hardware type devices. In some implementations, the back-end system 130 includes computer systems using clustered computers and components acting as a single pool of seamless resources when accessed through the network 110. For example, such implementations may be used in a data center or a storage area network (SAN) as well as for cloud computing or network attached storage (NAS) applications. In some implementations, the back-end system 130 is deployed using a virtual machine(s).

The computing devices 102, 104, 106 may each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 102 is provided as a smartphone, the computing device 104 is provided as a desktop computing device, and the computing device 106 is provided as a tablet-computing device. The server computing device 108 may each include any appropriate type of computing device, such as described above for computing devices 102-106 as well as computing devices with server-class hardware. In some implementations, the server computing device 108 may include computer systems using clustered computers and components to act as a single pool of seamless resources. It is contemplated, however, that implementations of the present disclosure can be realized with any of the appropriate computing devices, such as those mentioned previously.

FIG. 2 depicts an example cross-platform SDK 200 for the described rapid application development system. The example cross-platform SDK 200 may be hosted on a back-end system, such as back-end system 130 of FIG. 1. The example system 200 includes cloud based metadata editor 210, CPR 220, and a cloud platform 230. In some implementations, the metadata editor 210 may be tightly or loosely integrated into a service running on the cloud platform 230, while the CPR 220 may be built into a mobile or desktop application running on device.

As depicted, the metadata editor 210 includes a drag and drop visual editor 211, an intelligent code completion engine 212, and a metadata repository 213. In some implementations, other features may be integrated as part of the metadata editor 210. Examples of such features may include menus, toolbars, status bars, output consoles and so forth. The purpose of this editor is to help the analyst 202 rapidly create metadata without much programming skill. The generated metadata may be stored in the metadata repository 213. The metadata may be minified and synchronized to persistent repositories of mobile application services 231 running on the cloud platform 230.

In the depicted example, the CPR 220 includes a metadata repository 221, a metadata interpreter 222, and a distributed ledger action engine 223. In some implementations, the CPR 220 may be integrated into a mobile or desktop application during the application being built process. In some implementations, the metadata repository 221 can receive (e.g., push or pull) metadata from the persistent repositories of the mobile application services 231 on the cloud platform 230. The received metadata can be a complete replacement or a delta update of an existing metadata file persisted to the metadata repository 221.

Figure 3:
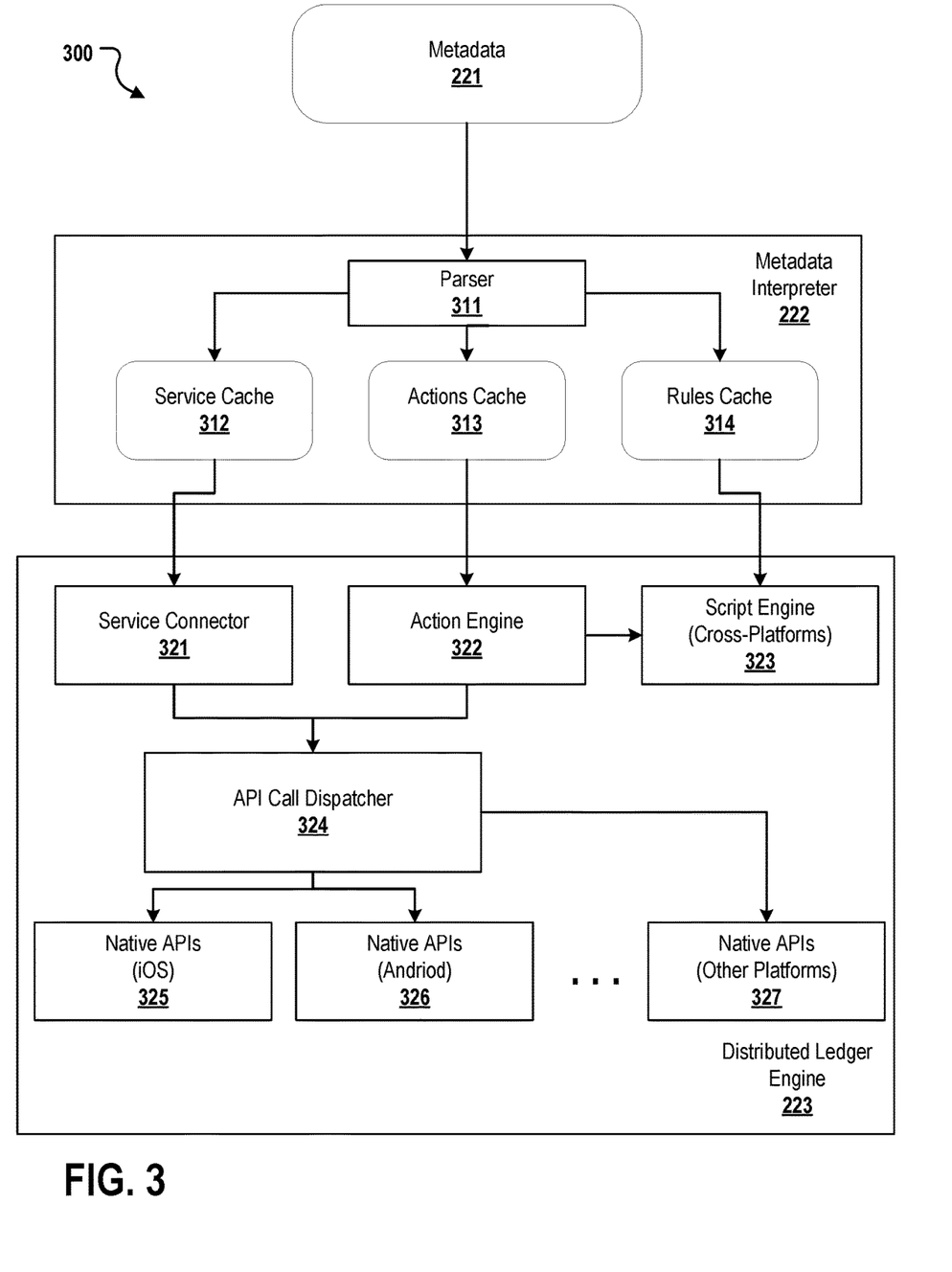
FIG. 3 depicts an example architecture of a Cross-Platform Runtime (CPR) for a rapid application development system.

FIG. 3 depicts an example architecture of a CPR, such as CPR 220 of FIG. 2. In some implementations, the metadata interpreter 222 analyzes metadata with metadata parser 311 and stores the metadata to the various caches 312, 313, and 314 according to a determined type. Such types may include distributed ledger services connections, distributed ledger actions, and custom rules.

The following is a metadata example of services connection, which may be generated through the cloud-based metadata editor 210.
//My Blockchain service connection
{
    "DestinationName": "com.mycloud.blockchainservices",
    "ServiceUrl": "https://bloachainservices.mycloud.com",
    "LanguageURLParam" "my-language"
}

The distributed ledger engine action 223 sets up connection to the ledger services 232 on the cloud platform 230. The service connector 321 reads service connection definitions in the service connection cache 312 and sends a request to the API call dispatcher 324. The API call dispatcher 324 identifies, for example, the platform of the currently running application environment and the type of the call (e.g., a service connection call or a specific blockchain API call). For example, when a mobile application is running on an iOS device, the service connection call is from iOS, and therefore the call will be dispatched to the Native APIs executor (iOS) 325 to set up service connection to the ledger services 232 on the cloud platform 230. As another example, when a mobile application is running on an Android device, the service connection call is from Android, and therefore the call will be dispatched to the Native APIs executor (Android) 326 to set up service connection to the ledger services 232 on the cloud platform 230. Other platforms may also be supported and are represents as the native API executor 327. As the example above "My blockchain service connection", will set up connection to a service at, for example, a specified URL.

The following is a metadata example of blockchain actions, which may be generated through the cloud based metadata editor 210. The chain of actions will can executed from, for example, a mobile or desktop application to add a new asset into a distributed ledger based enterprise asset management system.
//ProposeTransaction.action
{
    "OnFailure": "/Actions/TransactionFailed.action",
    "OnSuccess": "/Actions/ReceiveEndorsement.action",
    "Properties": {
        "AssetDescription'" "*Control:AssetDescription/#Value",
    }
    "Target": {
        "AssetSet" "MyNewAsset",
        "Service" "/Blockchain/Services/asset.service"
    },
    "ActionResult": {
        "_Name": "NewTransaction"
    },
    "_Type" "Action.Type.BlockchainService.ProposeTransaction"
}
//ReceiveEndorsement.action
{
    "OnFailure" "/Actions/TransactionFailed.action",
    "OnSuccess" "/Actions/ValidTransaction.action",
    "Properties":
        "EndorsementDescription": "#Endorsement/#KeyValues",
    },
    "Target": {
        "AssetSet": "MyNewAsset",
        "Service": "/Blockchain/Services/asset.service"
    },

```
    "ActionResult": {
        "Name": "NewEndorsements"
    },
    "_Type":    "Action.Type.BlockchainService.ReceiveEn-
        dorsement"
}
//ValidTransaction.action
{
    "OnFailure" "/Actions/TransactionFailed.action",
    "OnSuccess": "/Actions/ValidTransaction.action",
    "Properties": {
        "TransactionDescription": "#Transaction/#Header",
    },
    "Target"
        "AssetSet": "MyNewAsset",
        "Service": "/Blockchain/Services/asset.service"
    },
    "ActionResult": {
        "Name": "NewTransaction"
    },
        "_Type": "Action.Type.BlockchainService.ValidTrans-
            action"
{
//CommitTransaction.action
{
    "OnFailure": "/Actions/TransactionFailed.action",
    "OnSuccess": "/Actions/CommitTransaction.action",
    "Properties"{
        "TransactionDescription": "#Transaction/#Header",
    },
    "Target":
        "AssetSet": "MyNewAsset",
        "Service": "/Blockchain/Services/asset.service"
    },
    "ActionResult": {
        "_Name": "NewCommittedTransaction"
    },
        "_Type":    "Action.Type.BlockchainService.Com-
            mitTransaction"
}
//UpdateLedger.action
{
    "OnFailure": "/Actions/TransactionFailed.action",
    "onSuccess": "/Actions/SmartContract.action",
    "Properties": {
        "LedgerDescription": "#Ledger/#Header",
    },
    "Target": {
        "AssetSet" "MyNewAsset",
        "Service" "/Blockchain/Services/asset.service"
    },
    "ActionResult": {
        "_Name": "NewLedger"
    },
    "Message":  "/Rules/CustomMessage_TransactionCom-
        pleted.js"
    "_Type":        "Action.Type.BlockchainService.Up-
        dateLedger"
}
```

In some implementations, after the service connection to the ledger service 232 is established, subsequent actions in distributed ledger actions cache 313 can be executed by action engine 322. Actions include configurable event handlers that can perform tasks. Such task can be canned business logic that is configurable through, for example, provided property values. A set of standard distributed ledger actions, which can support, for example, the most frequently employed use cases, can be built into the distributed ledger action engine 223. Examples of these built-in actions include ProposeTransaction, EndorseTransaction, ReceiveEndorsement, ValidateTransaction, CommitTransaction, UpdateLedger, QueryTransaction, SmartContract, and so forth.

In runtime, after metadata is parsed, the action list may be generated and saved in action cache 313. In some implementations, the action engine 322 reads the action list from the action cache 313 to obtain attributes, such as action identifier, name, type, properties, linked custom rules, and so forth. In some implementations, based on the action identifier and name, the action engine can dispatch an API call through the call dispatcher 324 to different Native APIs. The Native APIs receive the respective response to the API call from the respective ledger service 232 instance. For example, a call to iOS native API 325.

If there is linked custom rule, the action engine 322 may send the custom rule to cross-platform script engine 323 to execute when, for example, the rule related action event is triggered. For example, a script engine may be a JavaScript engine running inside an iOS app.

In some implementations, actions can be chained, nested, or recursively executed. An exemplary use case includes an action that starts a chain of actions (the metadata of actions, in JSON format, as provided above. An example use case may include adding a new property into an enterprise asset management system, which may be distributed ledger based. In such an example use case, a "New Asset" button may be included on a page of an asset management application. The application may be, for example, a cross-platform application running on/in iOS, Android, and a Web browser. When an analyst 202 presses the "New Asset" button, for example, a series of distributed ledger actions may be executed. Such actions may include proposing a new distributed ledger transaction from a current node, requesting other nodes' endorsements, receiving the endorsements coming back from other nodes, validating a transaction, committing transactions, updating the ledger, and so forth.

In some implementations, an analyst 202 may only need to write a metadata file using the cloud based metadata editor 210. For example, the user may write the metadata file in JSON as the above example. In this example, a chain of ledger actions are executed after the end user 204 presses the "New Asset" button with in application or web browser Such actions may include ProposeTransaction, ReceiveEndorsement, ValidateTransaction, CommitTransaction, UpdateLedger, and so forth. In some implementations, to chain the actions, a name of a next action can be specified in the event handler "OnSuccess" in current action, so as to make sure that the workflow executes sequentially, and only after the current ledger action succeeds. For example, to link the action to corresponding ledger service the "Target→Service" properties can be specified.

In certain use cases, built-in ledger actions may not be able to fully satisfy a requirement. In such cases, an analyst 202 can write rules to further extend the functionality of various ledger actions. For example, rules can be cross-platform script modules, which can be used to add application functionality. Such functionality may be written in a cross-platform script language, such as JavaScript. These rules can be bound with actions and/or executed by various events triggered by actions. A block based programming is supported in drag-and-drop visual editor 211 to enable analyst 202 to easily create rules without writing code. In some implementations, the drag-and-drop visual editor 211 employs visual blocks that link together to make writing code easier to generate, for example, a script. The generated custom rules can be bundled into metadata together with ledger actions. In runtime, the custom rules may be parsed and retrieved from metadata and stored into custom rules cache 314 by metadata interpreter 222. The custom rules can be executed by script engine 323, which is cross-platform (e.g., a JavaScript engine). In many cases, the execution of custom scripts can be triggered by various events from distributed ledger actions when such actions are being executed by actions engine 322.

In the above code example, a custom rule is executed after UpdateLedger.action. The custom rule has been bound to a property called "Message" in the action. This rule, Custom-Message_TransactionCompleted.js, is used to show a customized message after the distributed ledger actions in this example are executed successfully. The example is written in JavaScript to show the customized message after new asset transaction is completed. With the built-in actions, many standard requirements can be satisfied; however, the custom rules provide for a higher level of flexibility.

In some implementations, the ledger services 232 can be provided as instances of cloud-based services that are hosted by the cloud platform 230. Such services 232 can be implemented, for example, by open standard and able to be run on any cloud infrastructure provider. In some implementations, each service instance, which is considered a distributed node, can execute and commit distributed ledger related transactions and maintain a copy of a distributed ledger.

Figure 4:
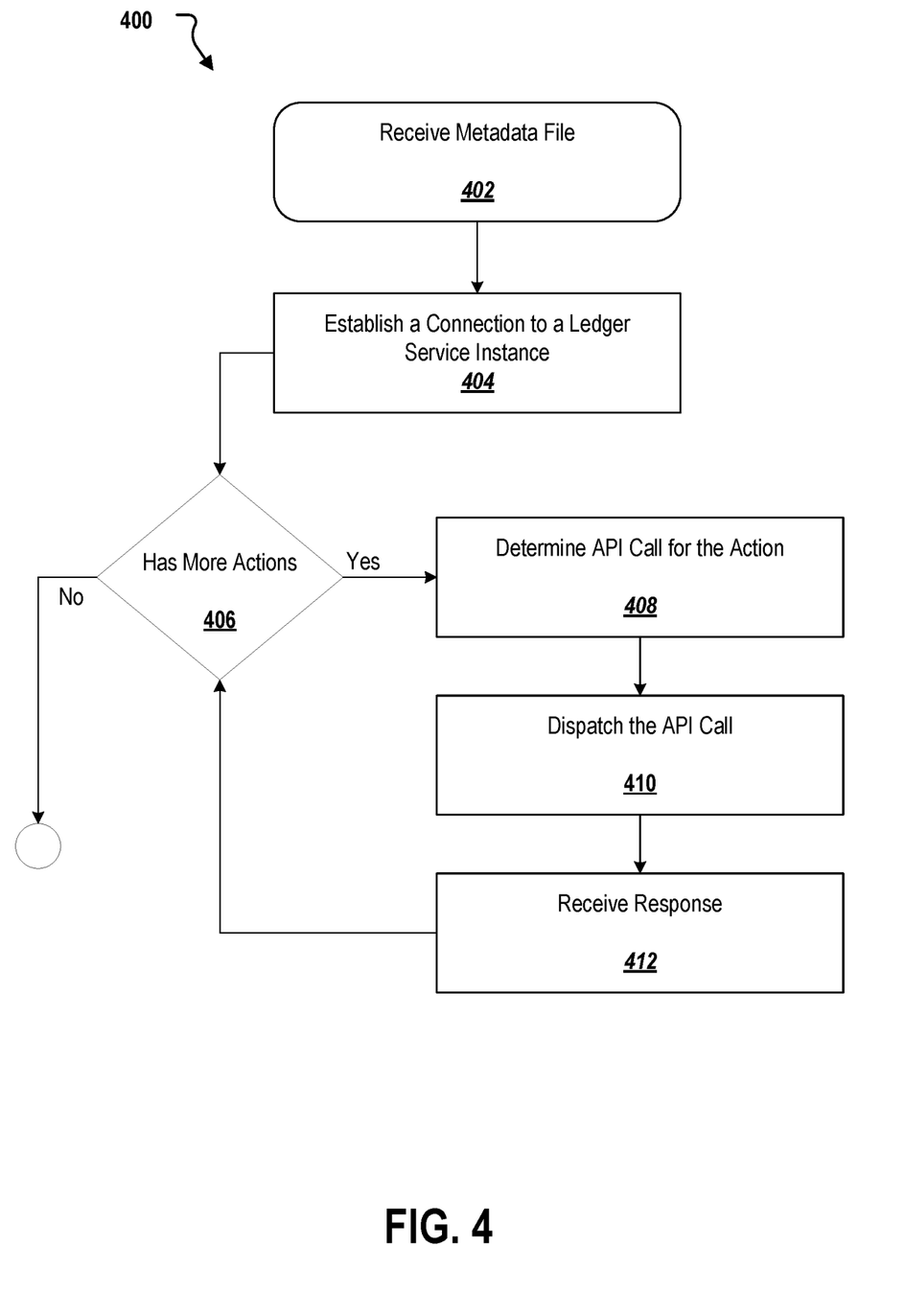
FIG. 4 depicts a flow diagram of an example process employed within a rapid application development system.

FIG. 4 depicts a flow diagram of an example process 400 employed within a rapid application development system. The example process 400 can be employed to execute a plurality of actions on a distributed ledger through a cloud-based ledger service instance. For clarity of presentation, the description that follows generally describes process 400 in the context of FIGS. 1-3 and 5. However, it will be understood that process 400 may be performed, for example, by any other suitable system, environment, software, and hardware, or a combination of systems, environments, software, and hardware as appropriate. In some implementations, various steps of the process 400 can be run in parallel, in combination, in loops, or in any order.

At 402, a metadata file is received from a cloud-based mobile application service. The metadata file includes service connection data and the actions to be executed on a distributed ledger. Each of the actions includes a plurality of attributes. In some implementations, each of the actions includes an event handler configured to perform a respective task. In some implementations, the event handlers are configured through property values. In some implementations, the attributes for each action include an action identifier and a name and the API is dispatched based on the action identifier and the name. In some implementations, the metadata file was composed within a cloud-based metadata studio through a drag-and-drop visual editor using intelligent code completion. In some implementations, the service connection data includes a URL to establish the connection to the instance of the cloud-based ledger service instance. In some implementations, the metadata file is a delta update for a previously received metadata file. In some implementations, the actions are chained, nested, or recursively executed. In some implementations, the metadata file is written in JSON. In some implementations, the cloud-based mobile application service and the cloud-based ledger service instance are hosted on a cloud-based platform. In some implementations, the metadata file is minified and synchronized to persistent repositories of on the cloud-based platform. In some implementations, the instance of the cloud-based ledger service maintains a copy of the distributed ledger. From 402, the process 400 proceeds to 404.

At 404, a connection to an instance of a cloud-based ledger service is established based on the service connection data and an identified application environment platform. The instance of the cloud-based ledger service executes and commits transactions to the distributed ledger. In some implementations, before establishing the connection to the instance, a native API executor is determined based on the identified application environment platform. In such implementations, the connection is established through the determined native API executor. From 404, the process 400 proceeds to 406.

At 406, a determination is made as to whether a next action is available for processing. When a next action is available, the action is processed in steps 408-412. When no next action is available, the process 400 ends.

At 408, an API call of the cloud-based ledger service instance to execute the action on the distributed ledger is determined. From 408, the process 400 proceeds to 410.

At 410, the determined API call is dispatched with respective attributes for the action. In some implementations, custom rule is included as an attribute for one of the actions and is executed through a cross-platform script engine based on a triggered action event. In some implementations, the custom rule includes a JavaScript executable. From 410, the process 400 proceeds to 412.

At 412, a response is received from the cloud-based ledger service instance based on a result of the determined API call. From 410, the process 400 proceeds to 406 to check for another action.

Figure 5:
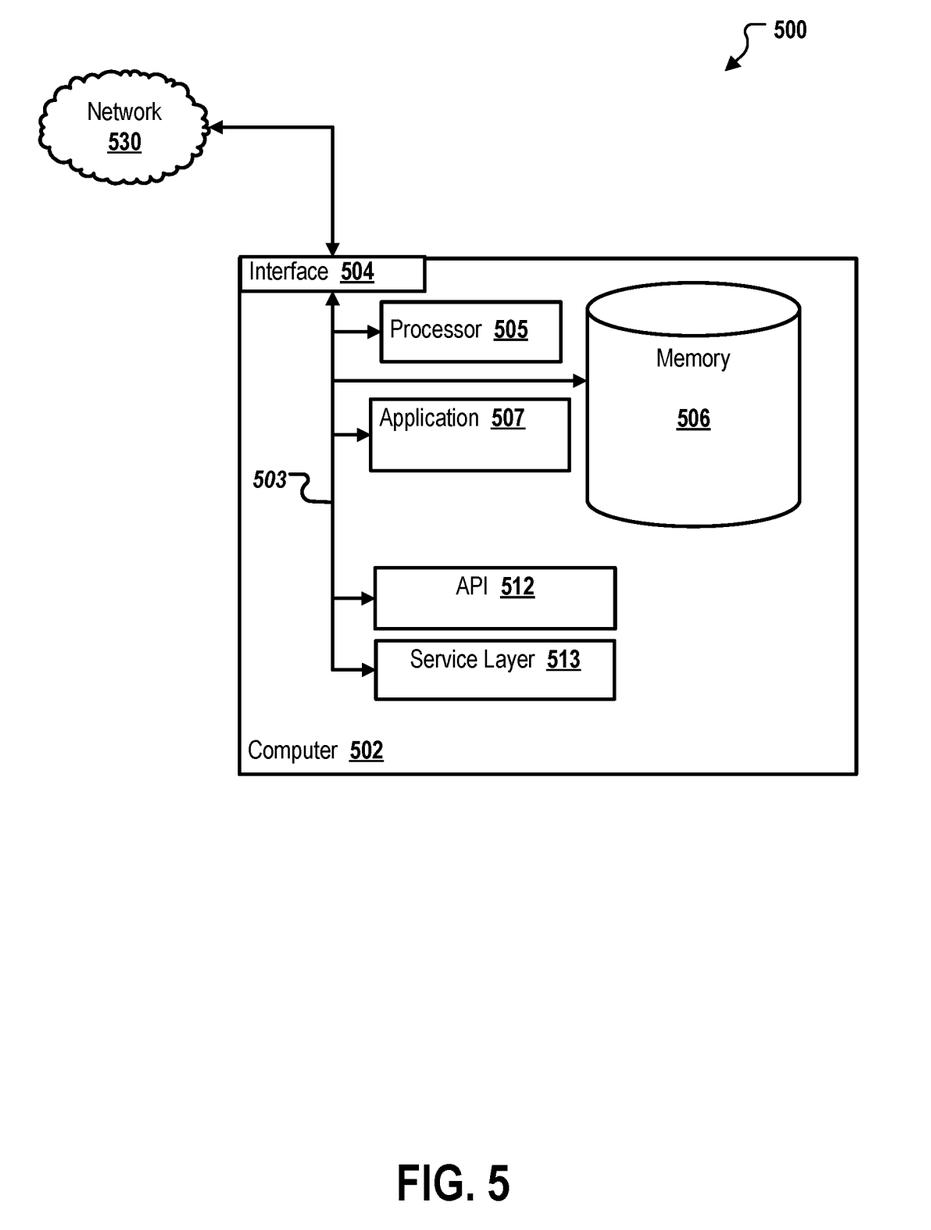
FIG. 5 depicts a block diagram of an exemplary computer system that can be employed to execute implementations of the present disclosure.

FIG. 5 depicts a block diagram of an exemplary computer system 500 used to provide computational functionalities associated with described algorithms, methods, functions, processes, flows, and procedures as described in the instant disclosure, according to an implementation. The illustrated computer 502 is intended to encompass any computing device such as a server, desktop computer, laptop or notebook computer, wireless data port, smart phone, PDA, tablet computing device, one or more processors within these devices, or any other suitable processing device, including both physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a graphical user interface (GUI).

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, business intelligence (BI) server, or other server (or a combination of servers).

The computer 502 can receive requests over network 530 from a client application (for example, executing on another computer 502) and responding to the received requests by processing the said requests in an appropriate software application. In addition, requests may also be sent to the computer 502 from internal users (for example, from a command console or by other appropriate access method), external or third parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or the interface 504 (or a combination of both) over the system bus 503 using an API 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems in a distributed environment that are connected to the network 530 (whether illustrated or not). Generally, the interface 504 comprises logic encoded in software or hardware (or a combination of software and hardware) and operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a memory 506 that holds data for the computer 502 or other components (or a combination of both) that can be connected to the network 530 (whether illustrated or not). For example, memory 506 can be a database storing data consistent with this disclosure. Although illustrated as a single memory 506 in FIG. 5, two or more memories may be used according to particular needs, desires, or particular implementations of the computer 502 and the described functionality. While memory 506 is illustrated as an integral component of the computer 502, in alternative implementations, memory 506 can be external to the computer 502.

The application 507 is an algorithmic software engine providing functionality according to particular needs, desires, or particular implementations of the computer 502, particularly with respect to functionality described in this disclosure. For example, application 507 can serve as one or more components, modules, applications, etc. Further, although illustrated as a single application 507, the application 507 may be implemented as multiple applications 507 on the computer 502. In addition, although illustrated as integral to the computer 502, in alternative implementations, the application 507 can be external to the computer 502.

There may be any number of computers 502 associated with, or external to, a computer system that includes computer 502, with each computer 502 communicating over network 530. Further, the term "client," "user," and other appropriate terminology may be used interchangeably as appropriate without departing from the scope of this disclosure. Moreover, this disclosure contemplates that many users may use one computer 502, or that one user may use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a PDA, a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and Compact Disc Read-Only Memory (CD-ROM), Digital Versatile Disk (DVD)+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), Light Emitting Diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A GUI may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of UI elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a LAN, a radio access network (RAN), a metropolitan area network (MAN), a WAN, Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an API or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for executing a plurality of actions on a distributed ledger through a cloud-based ledger service instance, the method being executed by one or more processors and comprising:
   receiving a metadata file from a cloud-based mobile application service, the metadata file including service connection data and the actions to be executed on the distributed ledger, wherein each of the actions includes a plurality of attributes;
   establishing a connection to an instance of a cloud-based ledger service based on the service connection data and an identified application environment platform, wherein the instance of the cloud-based ledger service executes and commits transactions to the distributed ledger; and
   for each of the actions:
      determining an application program interface (API) call of the cloud-based ledger service instance to execute the action on the distributed ledger;
      dispatching the determined API call with the respective attributes for the action; and
      receiving a response from the cloud-based ledger service instance based on a result of the determined API call.

2. The computer-implemented method of claim 1, comprising:
   before establishing the connection to the instance, determining a native API executor based on the identified application environment platform, wherein the connection is established through the determined native API executor.

3. The computer-implemented method of claim 1, wherein each of the actions includes an event handler configured to perform a respective task.

4. The computer-implemented method of claim 3, wherein the event handlers are configured through property values.

5. The computer-implemented method of claim 1, wherein the attributes for each action include an action identifier and a name, and wherein the API is dispatched based on the action identifier and the name.

6. The computer-implemented method of claim 1, comprising:
executing, through a cross-platform script engine, a custom rule based on a triggered action event, the custom rule included as an attribute for one of the actions.

7. The computer-implemented method of claim 6, wherein the custom rule includes a JavaScript executable.

8. The computer-implemented method of claim 1, wherein the metadata file was composed within a cloud-based metadata studio through a drag-and-drop visual editor using intelligent code completion.

9. The computer-implemented method of claim 1, wherein the service connection data includes a uniform resource locator (URL) to establish the connection to the instance of the cloud-based ledger service instance.

10. The computer-implemented method of claim 1, wherein the metadata file is a delta update for a previously received metadata file.

11. The computer-implemented method of claim 1, wherein the actions are chained, nested, or recursively executed.

12. The computer-implemented method of claim 11, wherein the metadata file is written in JavaScript Object Notation (JSON).

13. The computer-implemented method of claim 1, wherein the cloud-based mobile application service and the cloud-based ledger service instance are hosted on a cloud-based platform.

14. The computer-implemented method of claim 13, wherein the metadata file is minified and synchronized to persistent repositories of on the cloud-based platform.

15. The computer-implemented method of claim 1, wherein the instance of the cloud-based ledger service maintains a copy of the distributed ledger.

16. One or more non-transitory computer-readable storage media coupled to one or more processors and having instructions stored thereon which, when executed by the one or more processors, cause the one or more processors to perform operations comprising:
receiving a metadata file from a cloud-based mobile application service, the metadata file including service connection data and a plurality of actions to be executed on a distributed ledger, wherein each of the actions includes a plurality of attributes;
establishing a connection to an instance of a cloud-based ledger service based on the service connection data and an identified application environment platform, wherein the instance of the cloud-based ledger service executes and commits transactions to the distributed ledger; and
for each of the actions:
determining an application program interface (API) call of the cloud-based ledger service instance to execute the action on the distributed ledger;
dispatching the determined API call with the respective attributes for the action; and
receiving a response from the cloud-based ledger service instance based on a result of the determined API call.

17. The one or more non-transitory computer-readable media of claim 16, wherein the operations comprise:
before establishing the connection to the instance, determining a native API executor based on the identified application environment platform, wherein the connection is established through the determined native API executor.

18. The one or more non-transitory computer-readable media of claim 16, wherein each of the actions includes an event handler configured to perform a respective task, and wherein the event handlers are configured through property values.

19. A system, comprising:
a cloud-based mobile application service;
a cloud-based ledger service;
one or more processors; and
a computer-readable storage device coupled to the one or more processors and having instructions stored thereon which, when executed by the one or more processors, cause the one or more processors to perform operations comprising:
receiving a metadata file from the cloud-based mobile application service, the metadata file including service connection data and a plurality of actions to be executed on a distributed ledger, wherein each of the actions includes a plurality of attributes;
establishing a connection to an instance of the cloud-based ledger service based on the service connection data and an identified application environment platform, wherein the instance of the cloud-based ledger service executes and commits transactions to the distributed ledger; and
for each of the actions:
determining an application program interface (API) call of the cloud-based ledger service instance to execute the action on the distributed ledger;
dispatching the determined API call with the respective attributes for the action; and
receiving a response from the cloud-based ledger service instance based on a result of the determined API call.

20. The system of claim 19, wherein the operations comprise:
executing, through a cross-platform script engine, a custom rule based on a triggered action event, the custom rule included as an attribute for one of the actions.

* * * * *